United States Patent [19]
Paquet et al.

[11] Patent Number: 5,284,585
[45] Date of Patent: Feb. 8, 1994

[54] APPARATUS FOR RE-HOMOGENIZING A GAS/LIQUID MIXTURE

[75] Inventors: Jean-Marc Paquet; Jean-Pierre Chicherie, both of Annecy le Vieux, France

[73] Assignee: Alcatel Cit, Paris, France

[21] Appl. No.: 984,444

[22] Filed: Dec. 2, 1992

[30] Foreign Application Priority Data

Dec. 10, 1991 [FR] France .................. 91 15283

[51] Int. Cl.⁵ .................................... B01D 35/02
[52] U.S. Cl. ..................... 210/436; 210/437; 210/440; 210/443; 210/472; 210/416.1; 210/416.4; 210/416.5; 418/89
[58] Field of Search .............. 210/416.1, 416.4, 416.5, 210/199, 151, 218, 472, 436, 437, 440, 443; 261/75, DIG. 37; 418/89

[56] References Cited

U.S. PATENT DOCUMENTS

| | | | |
|---|---|---|---|
| 2,289,441 | 7/1942 | Valley et al. | 418/89 |
| 2,840,002 | 6/1958 | Elder et al. | 210/416.4 |
| 2,881,781 | 4/1959 | Tavernese et al. | 137/205.5 |
| 3,530,991 | 9/1970 | Phillips | 210/416.4 |
| 3,912,423 | 10/1975 | Pfabe | 210/416.4 |
| 4,268,230 | 5/1981 | Bassan | 418/89 |
| 4,830,745 | 5/1989 | Van der Meulen | 210/416.5 |

FOREIGN PATENT DOCUMENTS

0231993 8/1987 European Pat. Off.
476587 5/1915 France .

*Primary Examiner*—Stanley S. Silverman
*Assistant Examiner*—Cynthia L. Nessler
*Attorney, Agent, or Firm*—Sughrue, Mion, Zinn, Macpeak & Seas

[57] ABSTRACT

A gas/liquid mixture passes through a duct in which a filter device is interposed, the filter device being disposed such that its outlet duct is essentially vertical. The outlet duct opens out into a collecting enclosure placed above the filter device. A side outlet duct from the enclosure is disposed below the level of the liquid collected in the enclosure, a top portion collecting the gas given off above the level. The top portion communicates with the inlet of a jet which reinjects the gas into the outlet flow so as to form a homogeneous gas/liquid stream. The invention may be used, in particular, in the lubrication circuit of a vacuum pump having vanes and oil seals.

2 Claims, 1 Drawing Sheet

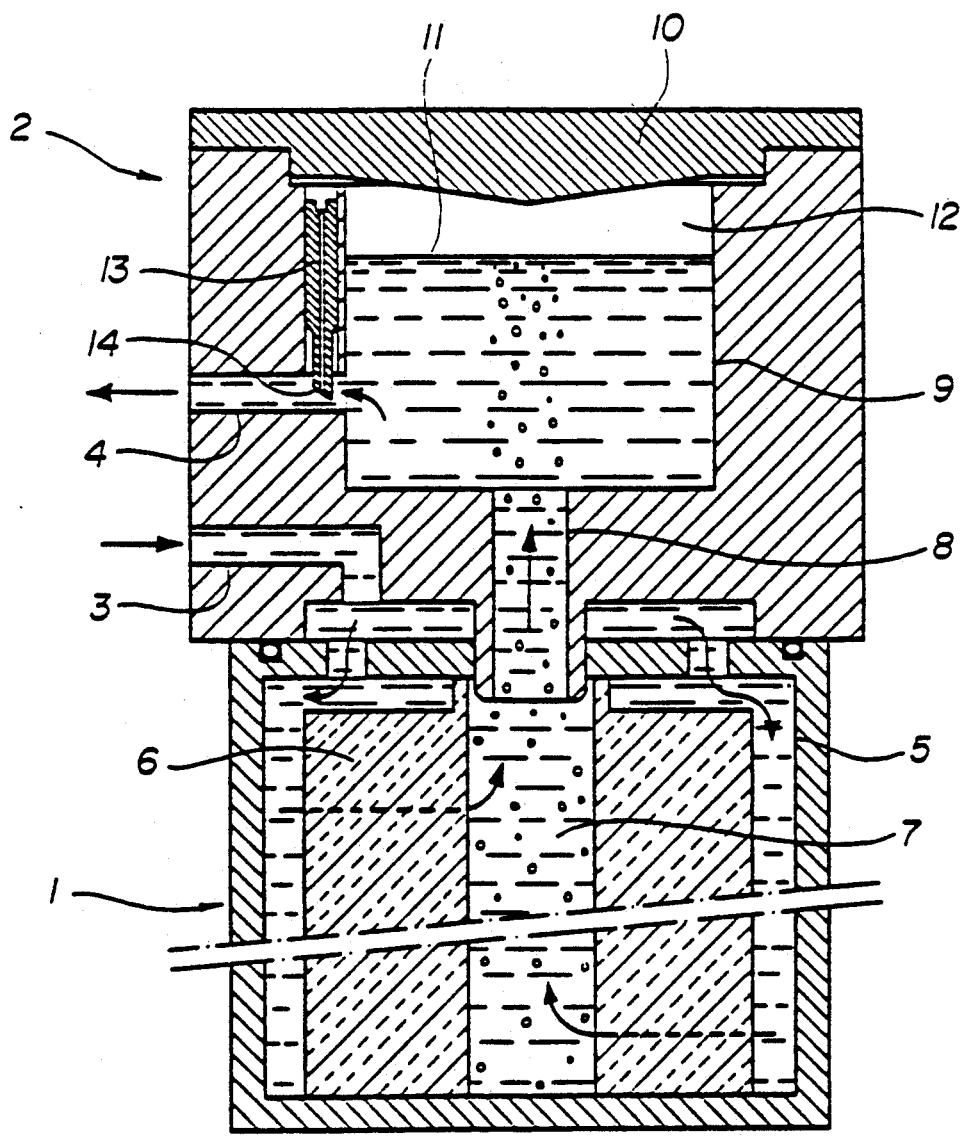

APPARATUS FOR RE-HOMOGENIZING A GAS/LIQUID MIXTURE

The present invention relates to apparatus for re-homogenizing a gas/liquid mixture passing through a duct in which a filter device is interposed.

BACKGROUND OF THE INVENTION

Such apparatus may be used, in particular, in the lubrication circuit of a vacuum pump having vanes and oil seals, in which circuit the lubricating oil is mixed with air so as to obtain a more elastic fluid avoiding knocking during the compression stages of the pump, and thereby reducing the operating noise thereof.

Such lubrication circuits are often equipped with a chemical or mechanical filter device through which the lubrication mixture passes via neutralizing and filter components. During the passage of the mixture, the speed of the stream is reduced, thereby giving rise to at least partial degassing of the oil. In currently-used filter devices, a pocket of air under pressure forms above the oil level, which pocket firstly reduces the effectiveness of the filter by making a portion of the filter component inactive, and secondly produces a heterogeneous stream of air and oil. The volume of the air pocket increases until the pocket reaches the level of the side outlet orifice through which the stream flows out. By then expanding inside the outlet duct, the air fills the outlet duct and creates a flow of air which alternates with the flow of oil. This causes the vacuum pump to operate irregularly, and produces noise.

An object of the invention is to remedy these drawbacks, and to provide apparatus producing a homogeneous flow of gas/liquid mixture at a regular flow-rate.

SUMMARY OF THE INVENTION

To this end, the present invention provides apparatus in which the filter device is disposed such that its outlet duct is essentially vertical, and wherein said outlet duct opens out into a collecting enclosure placed above the filter device, which enclosure includes a side outlet duct disposed below the level of the liquid collected in the enclosure, a top portion collecting the gas given off above the level of liquid, said top portion communicating with the inlet of a jet whose outlet orifice opens out into said side outlet duct of the collecting enclosure, so as to reinject the gas collected in the top portion of the collecting enclosure into the outlet flow and form a homogeneous gas/liquid stream.

Preferably, the collecting enclosure includes a cover whose central portion is closer to the level of liquid in the enclosure than the peripheral portion, which peripheral portion communicates with said jet.

BRIEF DESCRIPTION OF THE DRAWING

An embodiment of the invention is described by way of example with reference to the accompanying drawing, in which the sole figure is an axial section through apparatus of the invention for re-homogenizing an air/oil mixture.

DETAILED DESCRIPTION

The assembly shown in the figure includes a filter device 1 and a re-homogenizing portion 2 for re-homogenizing an air/oil mixture arriving via an inlet duct 3 and leaving via an outlet duct 4. The path of the fluid is indicated by arrows in the diagram of the figure.

The filter device includes a chamber 5 in which an essentially cylindrical filter component 6 is disposed, the air/oil mixture having to pass through the filter component. In the inside 7 of the component, the oil contains large air bubbles which rise to the surface of the oil via an outlet duct 8 disposed vertically and on the axis of the filter device. The duct 8 opens out into a collecting enclosure 9 closed by means of a cover 10 having a slightly conical inside shape, as shown in the figure.

In the collecting enclosure 9, the oil reaches a level 11, and the air bubbles join together in the top portion 12 which communicates with an inlet orifice of a jet 13. Since the inlet orifice is situated at the periphery of the enclosure 9, the shape of the cover 10 with its lower central portion facilitates the flow of air towards the peripheral orifice. The outlet orifice 14 of the jet 13 opens out into the outlet duct 4 which passes through the side wall of the enclosure 9 above the oil level 11. The oil goes past the outlet orifice 14 of the jet 13 fast enough to ensure that the air collected in the top portion 12 of the enclosure 9 is sucked and injected into the flow of oil, thereby forming a regular and homogeneous stream of air/oil mixture at the output of the duct 4.

Naturally, the application of the apparatus of the invention is not limited to the example given of a lubrication circuit in a vacuum pump. Such re-homogenizing apparatus may be used advantageously in any hydraulic machine that works with a gas/liquid mixture.

We claim:

1. Apparatus for re-homogenizing a gas/liquid mixture passing through a duct in which a filter device is interposed, said apparatus comprising a filter device and a collecting enclosure; said filter device having an essentially vertical outlet duct; said outlet duct opening out into the collecting enclosure; the collecting enclosure being placed above the filter device; the collecting enclosure including a side outlet duct disposed below the level of liquid collected in the collecting enclosure, a jet having an inlet and an outlet orifice, and a top portion collecting the gas given off above the level of liquid; said top portion communicating with the inlet of said jet; said outlet orifice opening out into said side outlet duct of the collecting enclosure; so as to reinject the gas collected in the top portion of the collecting enclosure into the outlet flow and form a homogeneous gas/liquid stream.

2. Apparatus according to claim 1, wherein the collecting enclosure includes a cover having a central portion and a peripheral portion; said central portion being closer to the level of liquid in the collecting enclosure than the peripheral portion; said peripheral portion communicating with the inlet of said jet.

* * * * *